Figure 1:
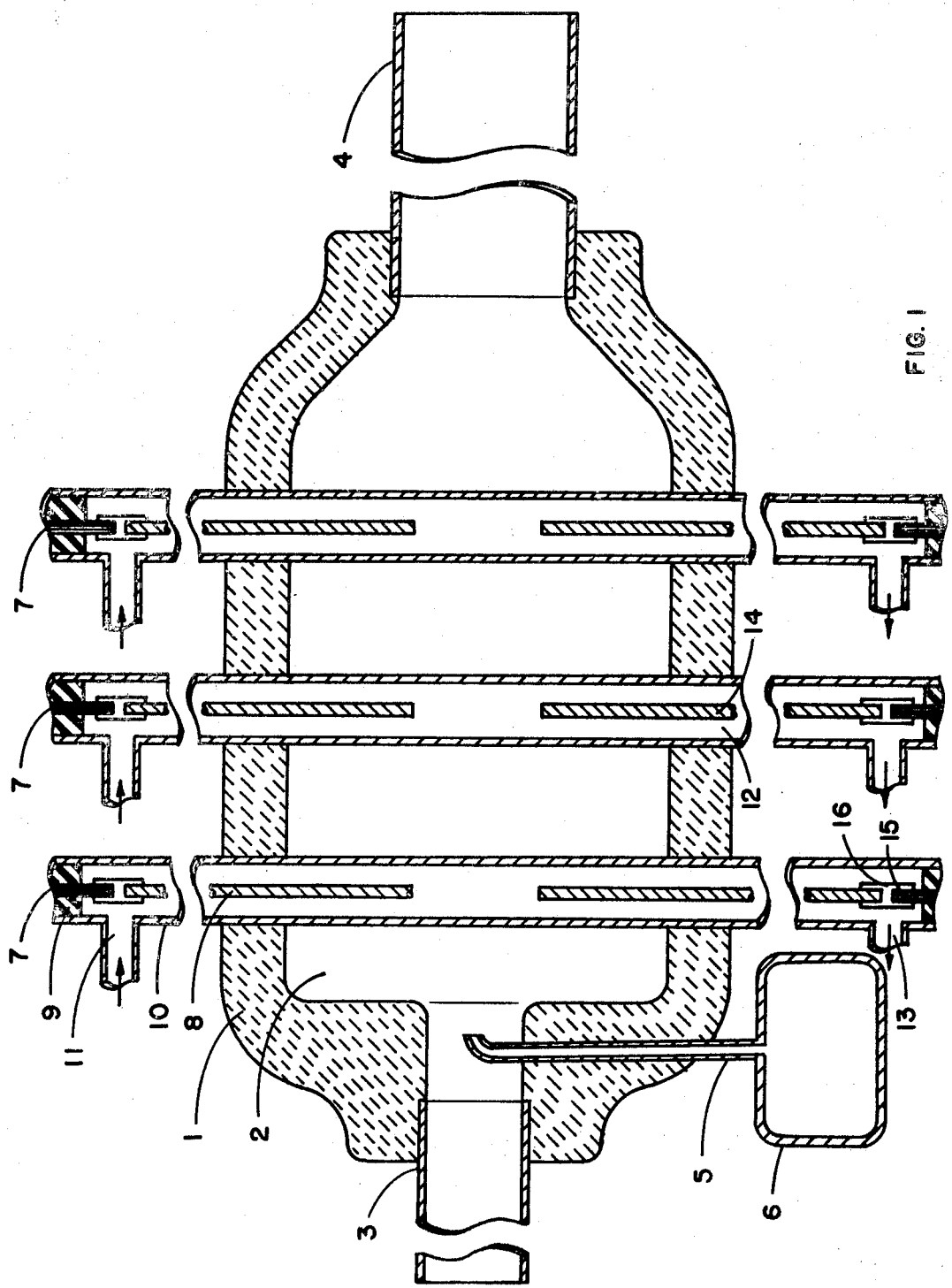

United States Patent [19]
O'Hare

[11] 3,737,688
[45] June 5, 1973

[54] CHANGING CAPACITY ELECTRIC GENERATOR

[76] Inventor: Louis Richard O'Hare, 2700 Indiana, N.E., Albuquerque, N. Mex.

[22] Filed: June 14, 1971

[21] Appl. No.: 153,465

[52] U.S. Cl..........................................310/2, 310/10
[51] Int. Cl. ......................................................H02n
[58] Field of Search..........................310/5, 10, 2, 6, 310/11; 322/2 A; 317/246

[56] References Cited
UNITED STATES PATENTS
| | | | |
|---|---|---|---|
| 2,413,391 | 12/1946 | Usselman | 310/5 X |
| 3,412,318 | 11/1968 | Robinson | 310/5 X |
| 3,610,970 | 10/1971 | Skinner | 310/10 |
| 3,582,693 | 6/1971 | O'Hare | 310/10 |

*Primary Examiner*—D. F. Duggan

[57] ABSTRACT

In the changing capacity electric generator, the electrostatic capacitance existing between oppositely charged condenser elements in a ceramic resonant combustion chamber is periodically increased when combustion takes place producing ionized gases and periodically decreased when evacuating gas currents remove the ionized gases. The changing capacitance so produced causes a current flow when this changing capacitance is placed in series electric circuitry with a high voltage transformer and a charged fixed condenser enabling electric work to be done from the secondary of the transformer.

3 Claims, 3 Drawing Figures

PATENTED JUN 5 1973

3,737,688

SHEET 1 OF 2

INVENTOR.
BY Louis Richard O'Hare

INVENTOR.
BY Louis R. O'Hare

CHANGING CAPACITY ELECTRIC GENERATOR

This invention relates to electrohydrodynamic devices which use fluids and electrostatic fields to generate electricity. The object is to generate electricity efficiently with a minimum of moving parts and in a relatively simple manner. The specification follows. My invention uses ionization energy derived from either fuel combustion or gases laden with radioactive particles or light energy as ultra violet, visible or infra red when such energy is employed to ionize a volume of gas in a cavity when this volume of gas is used for its electrical conductive properties specifically when this electrical conducitvity is employed as a means of increasing electrical capacitance between capacitor elements. Means are applied to use the energy in surges or pulses in order that alternate periods of ionization and deionization result. During that period in which the gases are ionized and become an electrically conductive medium the electric capacitance between two sets of electric capacitor elements is increased and alternately during a subsequent period of deionization there is a removal of conductivity and a lowering of capacitance. The reason for this later part of the cycle is that without the conducting ionized gases between the condenser elements the physical separation of the elements precludes much electrostatic inductive interaction whereas with ionization and consequent conductivity present the physical distance of separation is abridged by an electricaly conductive medium. The net effect then of the ionizing and deionizing action is to produce a condenser of constantly changing capacity and when such a condenser with at least one heavily insulated element is placed in a series electric circuit with a fixed type of capacitor and an electric load there results a pumping action as the current is made to flow through the load from the charged fixed condenser to the variable capacity condenser as ionization and conductivity increase the capacitance of the variable capacitor. If the capacitance of the variable capacitor increases to the same value as the fixed capacitor current will flow until the total charge originally on the fixed capacitor is now equally distributed on the two equally valued condensers. Subsequently during deionization as conductivity decreases and capacitance drops on the variable capacitor then that part of the variable capacitors charge which was its share now is being held by that variable capacitor with less capacitance and since the capacitance is less and the charge is the same the voltage on this condenser increases moving the charge to the fixed condenser where the voltage is what it was. In doing this the charge is compelled to move through the load where it can produce electrical work.

In a former patent by this inventor, U.S. Pat. No. 3,582,693 in which the same principles apply there was a less effective use of insulating materials and much less variation in capacity was available from the variable capacitor. With the use of capacitor oils with their very high breakdown voltage both to insulate the variable capacitor elements as well as to cool them in a circuit in which these oils circulate in a cooling cycle a much higher electric capacitance is possible during the ionization period as the elements of the capacitor may be inserted directly into the volume of hot ionized gases. Because of the insulating quality of oils higher voltages may be applied in a smaller volume and finally, becuase of the formula, charge equals voltage multiplied by capacitance, since the voltage is higher the charge is higher and the power which is a result of the product of the two is that much larger. As a result the use of fuel and space is more efficient with this new method. The accumulated charge which was in the former concept held on spheres which consumed much space per quantity of charge is now held in a fixed capacitor of the plate type using high vacuum techniques or larger quantities of insulating fluid and thereby conserving space.

In the drawings

FIG. 1 illustrates the ionization and reaction chamber in which an energy source such as combustion of fuel reacts to produce pulses of heat and periods of ionization wherein electrically conducting ions react with the fields of electrostatic condenser elements as any conducting medium would react between opposite insulated plates of a condenser namely to periodically increase the capacitance of the condenser. Of this FIG. 1 is a ceramic type strongly insulating wall. The cavity in which the gases are ionized is shown by 2. The inlet opening tube into which air or other appropriate gas is admitted for passage into the reaction chamber is shown by 3 and the size of this tube is in a certain proportion to the size of the reaction or combustion chamber to permit pulsating combustion when used in conjunction with exit tube 4 of proportionate dimensions. Fuel and seeding material may be admitted through a meterng fuel line 5 with its supply tank 6. High voltage cables 7 carry extremely high voltage to condenser elements 8. The high voltage solid insulation 9 protects the cables. Whereas ceramic tubes 10 conduct insulating fluid admitted at inlets 11. This insulating fluid 12 is circulated across opposite condenser elements and through a cooling radiator to serve the purpose of cooling the electrodes as well as of thermally protecting them from deterioration. Coolant-insulator exists through outlets 13. There is a separate designation 14 for the condenser elements which are opposite elements 8 and which capacitively react with the ionized gas in the chamber by electrostatic induction through dielectric fluid and through the conducting ions and by means of them react as a condenser with insulated condenser elements 8. Cables 15 bring opposite polarity voltage to elements 14 through electric connectors 16.

Figure 2:
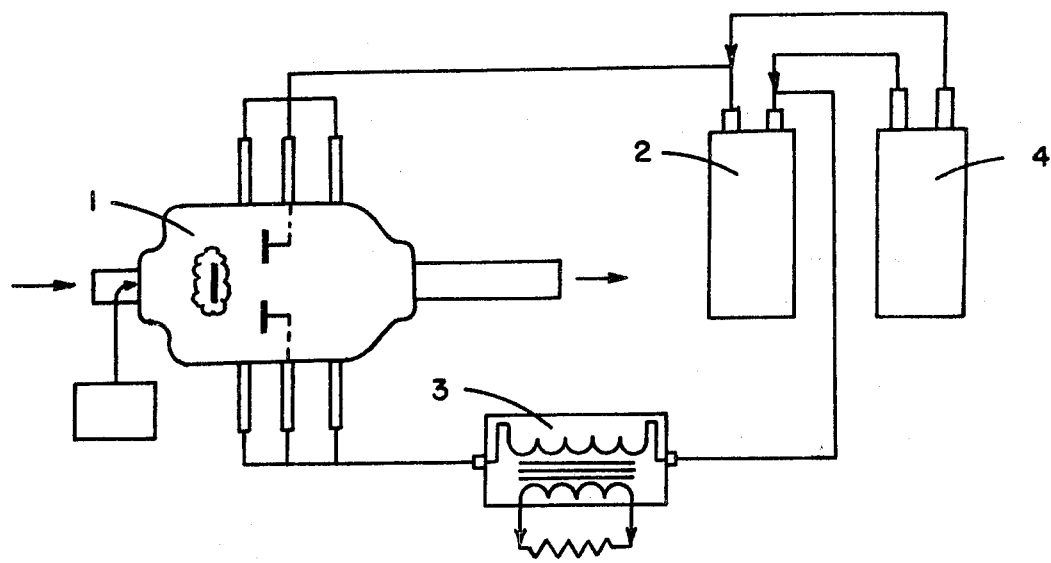

FIG. 2 is a block diagram indicating the electric circuitry and an exciter power supply used to periodically restore the fixed capacitor to maximum voltage. The changing capacity reaction chamber is indicated by 1. The fixed capacitor capable of 300,000 volts is indicated by 2. The electric load is depicted by 3 and the exciter power supply is 4.

Figure 3:
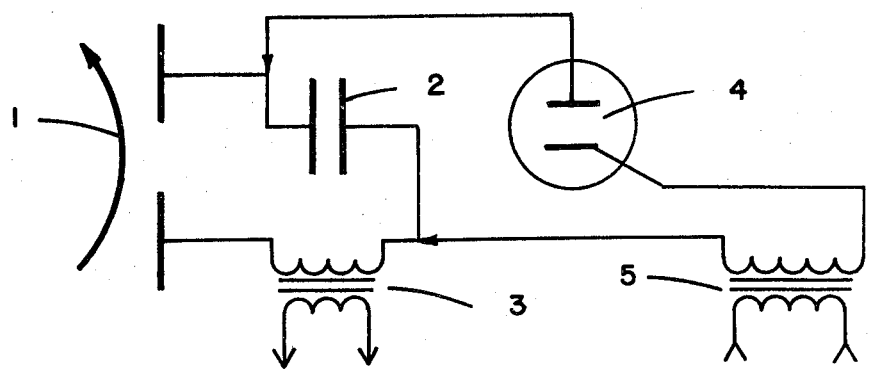

FIG. 3 is a schematic diagram. The symbol for the reactor is best illustrated by the symbol of a variable capacitor with two fixed plates or elements and a conductive moving rotor which represents the action of the ions in creating the capacitance between the fixed elements as well as of removing the capacitance between the plates as when the ionization ceases between pulses of energy. This symbol is 1. The symbol for the fixed capacitor is 2. A transformer 3 is a symbol of a type of electric load which could be used. A rectifier 4 in series with a 500,000 volt transformer 5 is a type of power supply which might be used for the initial charge on the fixed capacitor and raise voltage when necessary.

In another embodiment of the basic inventive concept the ionization and evacuation process of FIG. 1 in which combustion produces ionization and the pulsed furnace type of pulse jet carries away the combustion products and accompanying ions may be replaced by a carrier gas stream flowing through the same reaction chamber in which alternate ionization and deionization periods are achieved by an alternate seeding and non-seeding of the gas stream with radio active particles. If the carrier gas flow is kept laminar then during those periods in which the moving gas is carrying particles through the reaction chamber there will be ionization and conductivity present together with its increased capacitance causing quality. During the periods the gas is not carrying the particles there will be a reduction of capacitance.

In still another embodiment of the basic inventive concept radiation of various types may be admitted intermittently through inlet opening 3 of FIG. 1 to produce intermittent periods of ionization. For example ultra violet radiation of a wavelength of 784 Angstrom units will ionize nitrogen gas and mercury vapor in the reaction chamber could be ionized by radiation of 1,192 Angstrom units thereby producing periods of ionization conductivity and capacitance to be used as described above. Electron beams alpha, gamma or proton beams could be similarly used.

Therefore what I claim is:

1. A generator of electricity which comprises a fixed condenser of 300 K.V. or more being charged to potential by a power supply of equivalent voltage and a variable capacitor-reaction chamber connected in series electric circuit to said fixed capacitor and to extremely high voltage transfromer for impedance matching to an electric load, said variable capacitance-reaction chamber consisting of an insulated cavity in which gases may be ionized in one instance by combustion and removed in one direction by the action of pulsating combustion conductivity of the ions being augmented by addition of alkali metal salts to fuel material the changing capacitance of this combustion and ionization chamber being accomplished by multiple cylindrical condenser elements of opposite polarities inserted in the walls of said combustion opposite each other said capacitor elements being inclosed in ceramic tubes between each of which tube and inclosed capacitor elements circulates high voltage insulation fluid such as high voltage transformer oil for the puspose of cooling and thermally insulating said capacitor elements from electric arcing as well as from heat, the electric capacity between oppositely charged elements being respectively increased and decreased by combustion causing ionization and conductivity between the insulated capacitor elements on one hand and by evacuation of combustion caused ions wth loss of conductivity between insulated capacitor elements on the other hand with this said increase and decrease in capacity causing a pumping action whereby the charge residing in the fixed condenser is distributed through the transformer to the capacitance of the reaction chamber during periods of ionization in the chamber and same charge is moved back by increased voltage in the chamber during periods of non-ionization to the fixed condenser which movement of charge through transformer primary windings produces useful current in output windings.

2. A generator of electricity which comprises a fixed condenser of 300 Kilovolts or more being charged to potential by a power supply of equivalent voltage and a variable capacitor reaction chamber which variable capacitor reactor is connected in a series electric circuit to said fixed capacitor and to an extremely high voltage transformer for impedance matching to an electric load said variable capacitance reaction chamber consisting of an insulated cavity in which gases may be ionized by discreet quantities of radio active materials entrained in a laminar flow carrier gas being admitted to and discharged from the reaction chamber at certain intervals, the changing capacitance of the reaction chamber being due to the alternate presence of radioactive particles in the stream and non-presence of particles in the stream the changing capacitance of this reaction chamber also being accomplished by multiple cylindrical condenser elements of opposite polarities inserted in the walls of said chamber opposite each other said capacitor elements being enclosed in ceramic tubes between each of which tubes and its enclosed capacitor element circulates high voltage insulation fluid such as high voltage transformer oil for the purpose of enabling electrical insulation in such a hot environment in that the fluid is circulated through a cooling means in its cycle, the electric capacity between oppositely charged elements being respectively increased and decreased by ionization caused by the emission of the various products of radio active decay of the particles suspended in the moving carrier gas followed by the periods of non ionization due to the absence of the radio active gas in the other parts of the stream with said increase and decrease in capacitance causing a pumping action whereby the charge residing in the fixed condenser is distributed to the capacitance of the reaction chamber by moving through the transformer windings during periods of ionization in the chamber and this same charge is subsequently moved back to the fixed condenser by means of increased voltage in the chamber during the periods of non ionization since then that charge is being held by less capacitance in the chamber and the necessary voltage rise forces the charge back through the transformer windings to the fixed condenser which current flow produces useful current in the output windings.

3. A generator of electricity which comprises a fixed condenser of 300 Kilovolts or more being charged to potential by a power supply of equivalent voltage and a variable capacitor reaction chamber which latter is connected in a series electric circuit to said fixed capacitor and to an extremely high voltage transformer for impedance matching to an electric load said variable capacitance reaction chamber consisting of an insulated cavity provided with means to supply a flow of gas and to provide periodic ionization of the gas by intermittent admission of radiation such as ultra violet, visible and infra red as well as by admission of electron, proton, alpha beta and gamma radiation the changing capacitance of the chamber being due to the alternate presence and absence of the radiation or beam, the changing capacitance of this chamber also being accomplished by the basic elements of any capacitance which in this case are multiple cylindrical condenser elements of opposite polarities insertd in the walls of said chamber opposite each other said capacitor elements being enclosed in ceramic tubes between each of which tubes and its enclosed capacitor element circulates high voltage fluid insulation in a cooling cycle through a cooling means for the purpose of enabling electrical high voltage insulation in such an environment, the electric capcity between oppositely charged elements being respectively increased and decreased by ionization and deionization caused by respective application and absence of radiation or beams said increase and decrease in capacitance causing a pumping action whereby the charge residing in the fixed condenser is distributed to the capacitance of the reaction chamber by moving through the transformer windings during periods of ionization in the chamber when its capacitance is high and this same charge is subsequently moved back to the fixed condenser by means of increased voltage in the chamber during the periods of non-ionization since then that charge is being held by less capacitance in the chamber and the necessary voltage rise there forces the charge back through the transformer windings to the fixed condenser which current flow produces useful current in the output windings.

* * * * *